(12) United States Patent  
Zhang et al.

(10) Patent No.: US 7,394,393 B2  
(45) Date of Patent: Jul. 1, 2008

(54) ADAPTIVE DRIVER WORKLOAD ESTIMATOR

(75) Inventors: Jing Zhang, Grosse Pointe Park, MI (US); Yilu Zhang, Plymouth, MI (US); Yuri Owechko, Newbury Park, CA (US)

(73) Assignee: GM Global Technology Operations, Inc., Detroit, MI (US)

( * ) Notice: Subject to any disclaimer, the term of this patent is extended or adjusted under 35 U.S.C. 154(b) by 196 days.

(21) Appl. No.: 11/195,469

(22) Filed: Aug. 2, 2005

(65) Prior Publication Data

US 2007/0063854 A1 Mar. 22, 2007

(51) Int. Cl.  
*G08B 23/00* (2006.01)

(52) U.S. Cl. .................. 340/576; 340/575; 340/573.1

(58) Field of Classification Search ............... 340/575, 340/576, 573.1, 573.7, 438, 439, 540; 701/1, 701/29, 36; 434/236, 258; 706/12, 20; 702/188  
See application file for complete search history.

(56) References Cited

U.S. PATENT DOCUMENTS

| | | | |
|---|---|---|---|
| 6,822,573 B2 * | 11/2004 | Basir et al. ................. | 340/575 |
| 6,879,969 B2 | 4/2005 | Engström et al. ............ | 706/20 |
| 6,925,425 B2 * | 8/2005 | Remboski et al. .......... | 702/188 |
| 6,974,326 B2 * | 12/2005 | Marple-Horvat ............ | 434/236 |
| 6,995,663 B2 * | 2/2006 | Geisler et al. ............... | 340/439 |
| 6,998,972 B2 * | 2/2006 | Geisler et al. ............... | 340/439 |
| 2003/0181822 A1 | 9/2003 | Victor ....................... | 600/558 |
| 2004/0254998 A1 | 12/2004 | Horvitz | |
| 2005/0030184 A1 | 2/2005 | Victor | |

OTHER PUBLICATIONS

International Search Report PCT/US 06/27999. Date of Mailing, Sep. 25, 2007. Date of International Filing, Jul. 19, 2006. 8 pgs.

* cited by examiner

*Primary Examiner*—Van T. Trieu

(57) ABSTRACT

A method for adaptive driver workload estimation. A subjective assessment of a driver workload is received from a vehicle driver. A stream of sensor input data is collected from one or more sensors in response to receiving the subjective assessment. A machine learning algorithm is applied to a driver workload estimate model based on the stream of sensor input data and the subjective assessment. The result of the applying is an updated driver workload estimate model.

19 Claims, 11 Drawing Sheets

| PARAMETER INDEX | PARAMETERS OR ATTRIBUTES |
|---|---|
| 1 | MEAN VEHICLE VELOCITY |
| 2 | STANDARD DEVIATION OF VEHICLE VELOCITY |
| 3 | MEAN LANE POSITION |
| 4 | STANDARD DEVIATION OF LANE POSITION |
| 5 | MEAN STEERING ANGLE |
| 6 | STANDARD DEVIATION OF STEERING ANGLE |
| 7 | MEAN ACCELERATION |
| 8 | STANDARD DEVIATION OF ACCELERATION |
| 9 | MEAN PUPIL DIAMETER |
| 10 | STANDARD DEVIATION OF PUPIL DIAMETER |
| 11-18 | PROPORTION OF EYEGLAZE ENTRIES FOR EACH REGION |
| 19-26 | PROPORTION OF EYEGLAZE TIME FOR EACH REGION |
| 27-34 | MEAN VISIT TIME FOR EACH REGION |

*FIG. 7*

THE CORRECT PREDICTION RATES (CPR) OF THE LEARNED DWE IN THE DRIVER-DEPENDENT CASE WITH THE 0.5s TIME WINDOW, OBTAINED WITH 10 FOLD CROSS VALIDATION.

| Sub #1  | 1    | 2    | 3    | 4    | 5    | 6    | 7    | 8    | 9    | 10   | 11   | 12   | Ave   |
|---------|------|------|------|------|------|------|------|------|------|------|------|------|-------|
| CPR (%) | 85.4 | 80.6 | 87.1 | 81.2 | 77.1 | 82.5 | 87.5 | 87.5 | 82.2 | 93.4 | 90.8 | 88.4 | 85.31 |

FIG. 10

THE RULES EXTRACTED FROM THE LEARNED DWE DECISION TREE IN THE DRIVER-INDEPENDENT CASE.
THE NUMBERS AFTER "F" REFERS TO THE INDEX OF THE PARAMETERS (ATTRIBUTES) LISTED IN TABLE 1.

Rule 1/1: (41.4/4.6, lift 2.2)
  F10 > 3.526
  F21 <= 0.0635
  -> class Task [0.871]

Rule 1/2: (13.9/1.5, lift 2.1)
  F01 <= 0.3084
  F21 <= 0.0635
  F23 <= 0.0023
  -> class Task [0.841]

Rule 1/3: (3.8, lift 2.1)
  F01 <= 2.4056
  F21 <= 0.0635
  F30 > 50.5714
  -> class Task [0.828]

Rule 1/4: (3.8, lift 2.1)
  F08 <= 0.0243
  F15 <= 0.0056
  F26 > 0.3819
  -> class Task [0.828]

Rule 1/5: (11.5/1.5, lift 2.1)
  F01 > 2.4056
  F21 <= 0.0635
  -> class Task [0.812]

Rule 1/6: (21.4/3.8, lift 2.0)
  F09 <= 21.2443
  -> class Task [0.794]

Rule 1/7: (9.9/1.5, lift 2.0)
  F01 <= -1.563
  F15 <= 0.0174
  -> class Task [0.788]

Rule 1/8: (11.5/3.1, lift 1.8)
  F15 > 0.0174
  F21 > 0.0635
  F28 <= 1.25
  -> class Task [0.699]

Rule 1/9: (45.2, lift 1.2)
  F09 > 21.2443
  F15 > 0.0056
  F15 <= 0.0174
  F21 > 0.0635
  -> class Control [0.979]

Rule 1/10: (92.1/1.5, lift 1.2)
  F01 > -1.563
  F08 > 0.0243
  F09 > 21.2443
  F15 <= 0.0174
  F21 > 0.0635
  -> class Control [0.973]

Rule 1/11: (31.6, lift 1.2)
  F01 > 0.3084
  F01 <= 2.4056
  F10 <= 3.526
  F30 <= 50.5714
  -> class Control [0.970]

Rule 1/12: (28.7, lift 1.2)
  F01 <= 2.4056
  F10 <= 3.526
  F23 > 0.0023
  F30 <= 50.5714
  -> class Control [0.967]

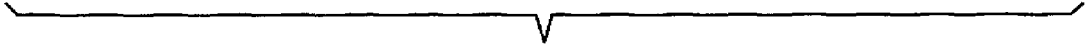

ADAPTIVE DRIVER WORKLOAD ESTIMATOR

BACKGROUND OF THE INVENTION

The present disclosure relates generally to driver workload estimation and in particular, to an adaptive driver workload estimator.

Driver workload estimator (DWE) refers to real-time continuous estimation of a driver's workload index by monitoring the driver, the vehicle and the driving environment. A DWE performs workload assessment continuously in real-time, under naturalistic driving conditions, and in a way that is highly unobtrusive to drivers. In some cases, when driver workload information is available, a number of in-vehicle functionalities can be enhanced, for example: presentation of information to drivers, active safety driver assistance, and vehicle chassis control.

There are three major types of driver workload: visual, manual and cognitive. When a driver is stressed by the manual driving task, or when the driver is mentally involved in a secondary task while driving, such as engaging in a cellular telephone conversation, his or her cognitive workload becomes high. The capability of detecting hazards and handling an elicited problem may be reduced. Cognitive workload is the most difficult to measure among the three major types of workload; it is essentially internal to the driver and only partially observable.

A long list of parameters is believed to be capable of reflecting a driver workload. The parameters include items such as: lane position deviation, lane departure duration, speed deviation, steering hold, brake pressure, vehicle headway, driver eye gaze fixation duration, eye gaze position variance, heart-beat interval variance, etc. While some are closer reflections of a driver's cognitive internal state than others, none alone stands to be a reliable indicator. Research has shown that the fusion of the parameters tends to provide better overall performance than individual parameters. Currently, there is no driver workload system that performs this fusion to provide a driver workload estimate.

The current DWEs are built with a manual workload analysis and modeling process, in which only parameters that demonstrate a high driver workload correlation are selected and manually modeled. These DWEs may omit promising candidate parameters that do not follow a unimodal Gaussian distribution, which is assumed by the design method. A parameter showing low correlation with workload level under the unimodal assumption is not necessarily a bad workload indicator.

In addition, the current "handcrafted" DWE models tend to be simple, such as linear regression models. Their parameter coverage is generally limited, such as the binary heuristics based workload estimators. This low level of model sophistication may be due to the cumbersome manual workload analysis and modeling method. As the number and capabilities of sensors increase in vehicles, and the list of promising parameters grows, these DWEs may not be able to adapt structurally. In order to account for these changes, estimation algorithms in current DWEs may have to be redesigned. Further, the current DWEs tend to be static, in that their estimation algorithms are "cemented" based on one set of available model data. They are not tailored and adaptive to individual driver workload characteristics.

BRIEF DESCRIPTION OF THE INVENTION

According to one aspect of the invention, a method is provided for adaptive driver workload estimation. A subjective assessment of a driver workload is received from a vehicle driver. A stream of sensor input data is collected from one or more sensors in response to receiving the subjective assessment. A machine learning algorithm is applied to a driver workload estimate model based on the stream of sensor input data and the subjective assessment. The result of the applying is an updated driver workload estimate model.

In another aspect, a system for adaptive driver workload estimation is provided. The system includes an input device and a microprocessor in communication with the input device. The microprocessor including instructions to facilitate receiving a subjective assessment of a driver workload from a vehicle driver via the input device. A stream of sensor input data is collected from one or more sensors in response to receiving the subjective assessment. A machine learning algorithm is applied to a driver workload estimate model based on the stream of sensor input data and the subjective assessment. The result of the applying is an updated driver workload estimate model.

In still another aspect, a computer program product for providing adaptive driver workload estimation comprises a storage medium readable by a processing circuit and storing instructions for execution by the processing circuit for performing a method. The method comprises A subjective assessment of a driver workload is received from a vehicle driver. A stream of sensor input data is collected from one or more sensors in response to receiving the subjective assessment. A machine learning algorithm is applied to a driver workload estimate model based on the stream of sensor input data and the subjective assessment. The result of the applying is an updated driver workload estimate model

BRIEF DESCRIPTION OF THE DRAWINGS

Referring to the exemplary drawings wherein like elements are numbered alike in the several FIGURES:

FIG. 7 is a list of exemplary parameters, or attributes, that are output from the signal-processing with data cache functional module 304 in exemplary embodiments of the present invention;

FIG. 10 lists the correct prediction rates of a learned DWE in exemplary embodiments of the present invention; and FIG. 11 lists the rules extracted from a learned DWE decision tree in exemplary embodiments of the present invention.

DETAILED DESCRIPTION OF THE INVENTION

Disclosed herein is a method of adaptive driver workload estimation. Briefly stated, the method utilizes observations about the driver, vehicle data, and environment data to estimate the workload placed on the vehicle driver. A conditional and adaptable model of the driver's workload is developed by assessing the marginal effects on the driver of the driver data, the vehicle data and the environment data. Exemplary embodiments of the present invention provide a DWE that uses machine learning techniques to capture optimal sensor input inter-relations, that adapts to individual drivers' cognitive behaviors over time, and that offers flexibility in additional sensor data inclusion for enhanced performance.

DWEs are currently used primarily to enhance in-vehicle information systems (IVISs) by allowing driver information presentation management based on the information of drivers' workload level. In addition, DWEs may provide input to vehicle handling and driver assistance system quality enhancement. As discussed above, current DWEs may omit promising candidate parameters that do not follow a unimodal Gaussian distribution. A parameter showing low correlation with workload level under the unimodal assumption is not necessarily a bad workload indicator. An illustration of this concept follows using a driver eye fixation duration parameter that has been studied extensively for workload estimation. As is known in the art, studies show contradictory findings in the relationship between workload level and driver eye fixation duration. Some studies show positive correlation and others show negative correlation. As a logical result, driver eye fixation duration is not a good workload indicator.

Figure 1:
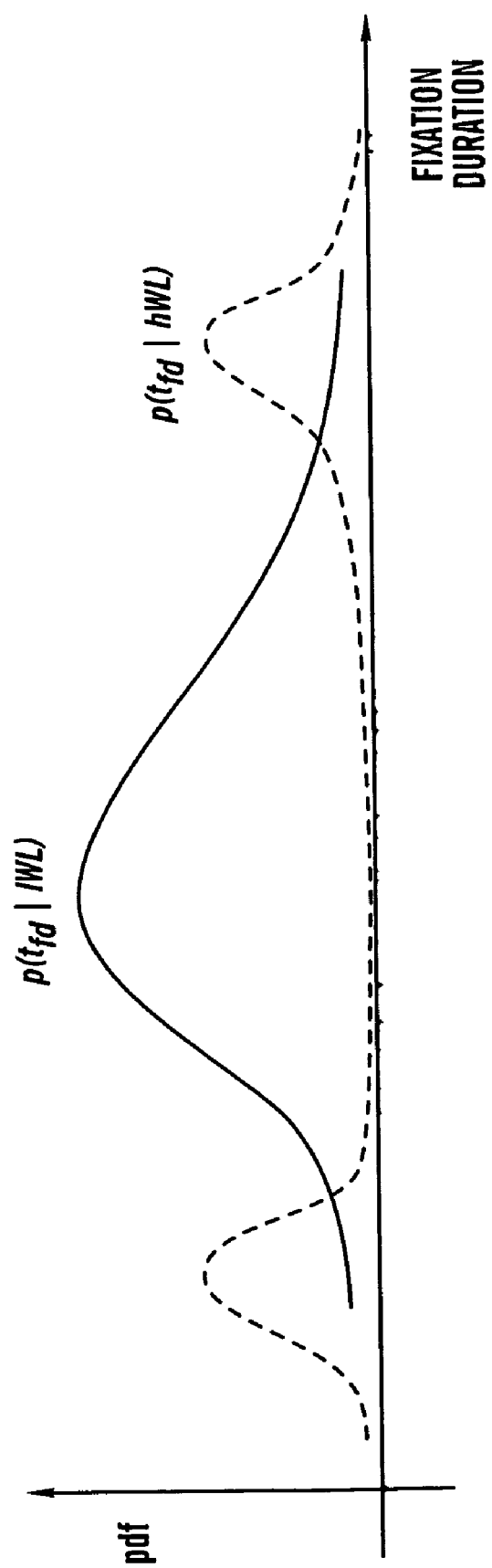
FIG. 1 is an exemplary probability distribution function of driver eye fixation duration under high and low workloads.

It can be shown, however, from the contrasting driver eye fixation duration variation trends under high driver workload, that the probability distribution function (pdf) of fixation duration ($t_{fd}$) under high workload ($p(t_{fd}|hWL)$) may be multi-modal, as shown in FIG. 1. Standard Bayesian analysis, a simple machine learning technique, can be performed to derive the probability of high workload given fixation duration, thus utilizing the fixation duration as an effective workload indicator. Bayesian analysis uses conditional pdfs, $p(t_{fd}|hWL)$ and $p(t_{fd}|lWL)$, as well as the prior probabilities ($p(hWL)$ and $p(t_{fd}|lWL)$), as shown in:

$$p(hWL|t_{fd}) = \frac{p(t_{fd}|hWL)p(hWL)}{p(t_{fd}|hWL)p(hWL) + p(t_{fd}|lWL)p(lWL)}.$$

Figure 2:
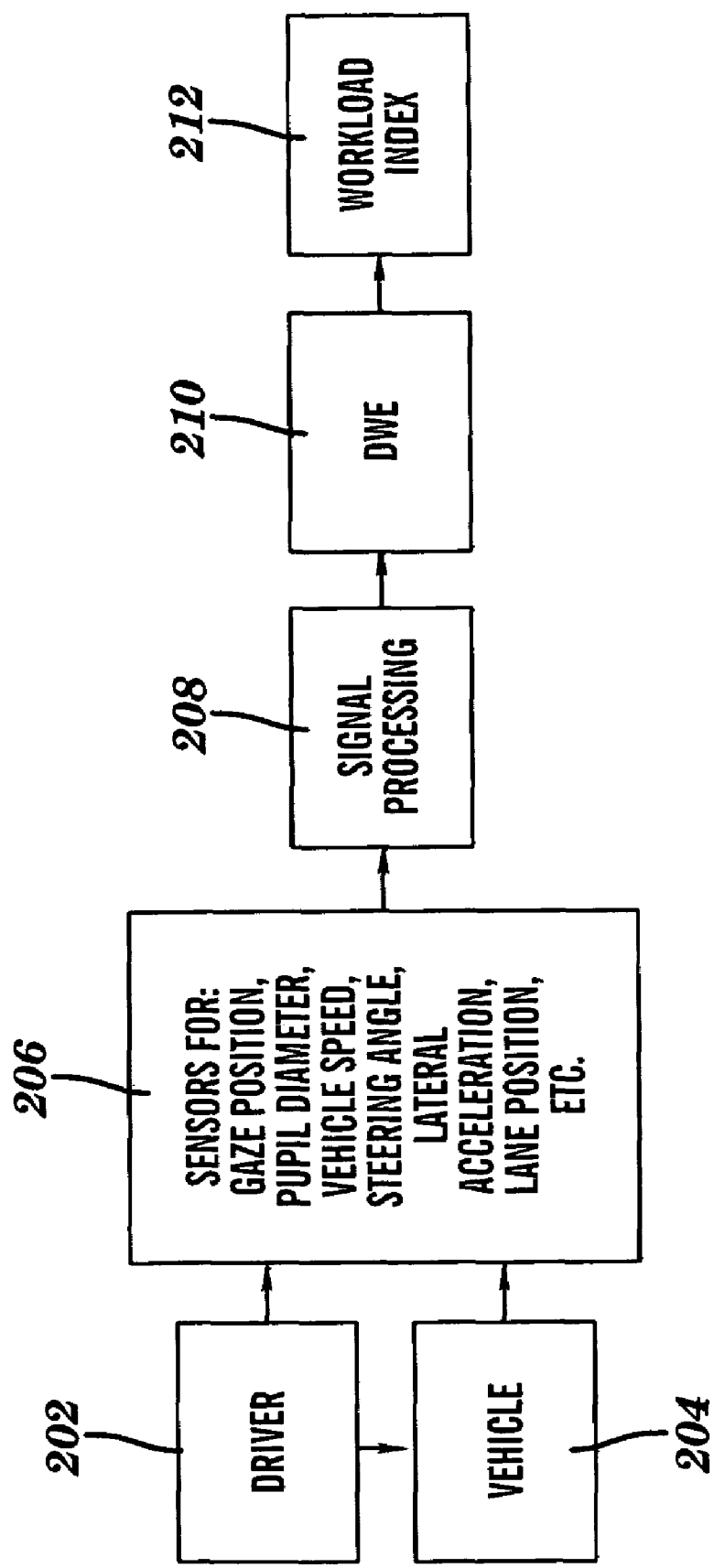
FIG. 2 is a block diagram of the general architecture of an exemplary DWE system.

FIG. 2 is a block diagram of the general architecture of an exemplary DWE system. Sensors 206 located on the vehicle 204 collect information to estimate a driver workload. The data may include vehicle data, driver data, and environment data. Any data that is available may be utilized including but not limited to, data relating to: maneuvering of the vehicle that reflects the driving performance of the driver 202 (e.g., standard deviation of the steering wheel angle), the overt behavior of the driver 202 (e.g., eye movement and heartbeat), and other factors such as vehicle speed, vehicle acceleration, steering wheel angle, lane width, lane position, and outside air temperature. A signal-processing functional module 208 includes hardware and/or for software manipulating the raw sensory inputs and generates parameters such as the standard deviation. The DWE module 210 takes the manipulated data and generates a cognitive workload index 212 in real time.

The DWE module 210 includes application code to create a workload index 212 (the logic performed by the application code is also referred to herein as a DWE model). In an exemplary embodiment of the present invention, the DWE module 210 and the signal processing functional module 208 are located on a microprocessor contained in the vehicle 204. The microprocessor may be dedicated to performing. DWE functions or, alternatively, the microprocessor may include application code for performing other vehicle functions along with the functions performed by the DWE module 202 and the signal processing functional module 208. In addition, storage space for intermediate application results as well as application inputs and outputs can be located on the microprocessor or located on an external storage device accessible by the microprocessor.

Vehicle data refers to data that is internally generated and received from sensors 206 located inside the vehicle 204. Vehicle data can include information such as vehicle speed, cruise control state, turn signal status, traction control status (TCS), antilock braking system (ABS) status, vehicle stability system data, powertrain data, steering wheel angle, brake pedal position, throttle pedal position data and lane position. Powertrain data can include information such as revolutions per minute (RPM), spark data and fuel data. Environment data is received from sensors 206 and refers to external light sensor/headlamp status data, wiper status, defroster status, outside air temperature (OAT), global positioning system (GPS) data, time of day, enhanced digital, maps, and lane width.

Observations about the driver, or driver data, may include sensor data that measures characteristics of the driver such as, but not limited to, gaze position, heart beat and pupil diameter. Driver data also includes data about the current tasks being performed by the driver 202. Current task data may include data such as radio information (e.g., is manipulation occurring) and phone information (e.g., is the phone active). Additional input data can also include information from an object detection and warning and/or lane sensing application or sensor. Examples include forward collision warning (FCW) data, side object detection (SOD) data, lane departure warning (LDW) data and rear collision warning (RCW) data. Further input may include infotainment and telematics system status; speech interface status and diagnostics data; and adaptive cruise control (ACC) system data.

The specific inputs to the DWE module 210 can vary between implementations depending on the input data available in a particular vehicle and the requirements of a particular implementation. A network can be used to obtain the data and the network can be internal to the vehicle or the network can provide access to information outside the vehicle. Any information that can be sensed, measured or input through an interface (e.g., wireless network) can be used as input. Environment data can be expanded to include information such as vehicle location data; external vehicle location data; traffic information both present and predicted; and weather information both present and predicted. The workload index 212 is updated on a periodic basis and may be represented as a numeric value (e.g. 1-10, 0%-100%, 1-3 etc.) that reflects relative workload levels. The workload estimate reflected in the workload index 212 can be relative to a starting state such as clear driving at normal speed or driver workload when the vehicle is stationary. In an alternate embodiment, data in addition to the numeric values may be included in the workload index 212.

Figure 3:
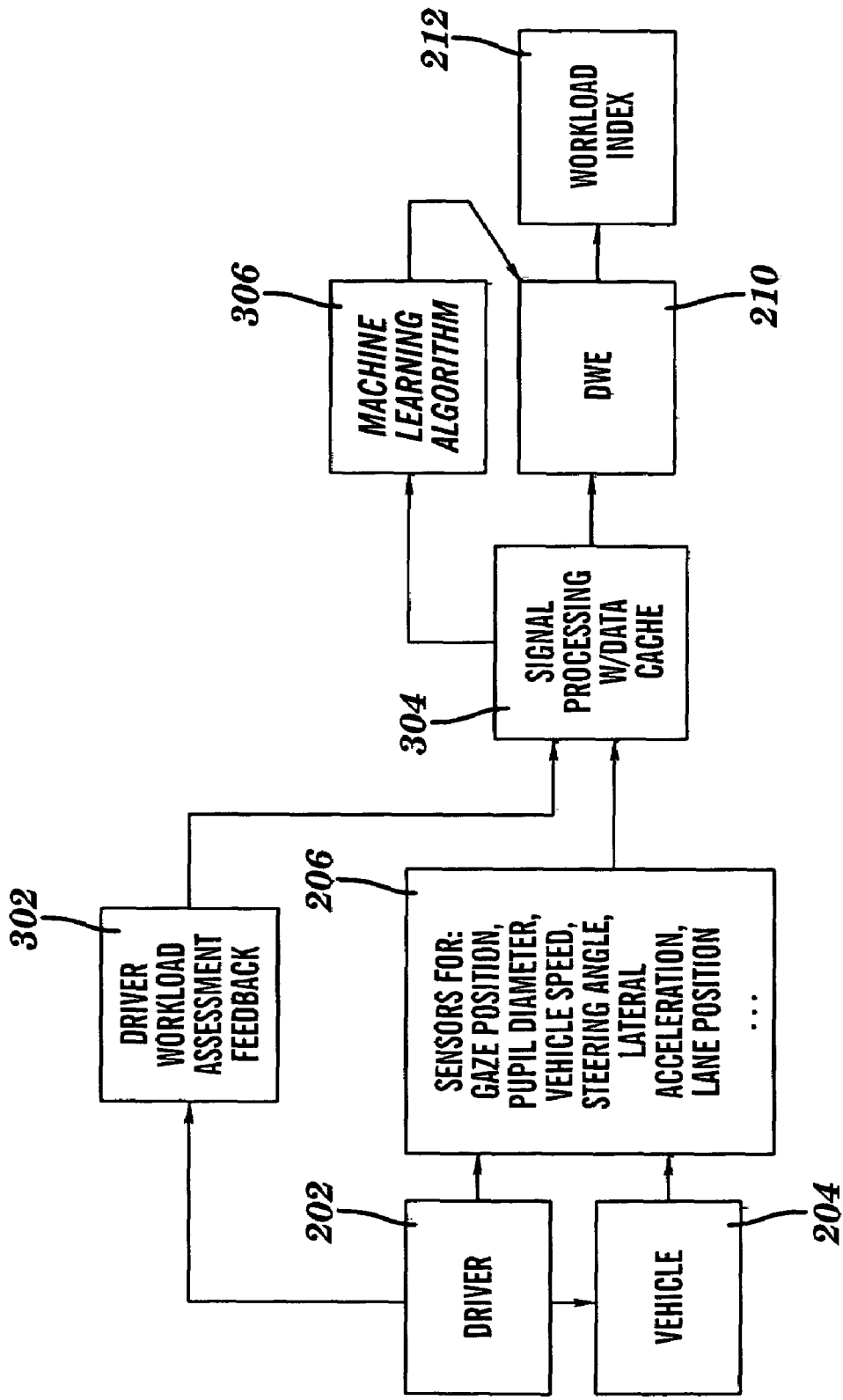
FIG. 3 is a block diagram of an exemplary learning-based DWE system.

FIG. 3 is a block diagram of an exemplary learning-based DWE system. The adaptive DWE system depicted in FIG. 3 includes two additional functional modules when compared to the DWE system depicted in FIG. 2. These two modules are the driver workload assessment feedback module 302 and the machine learning algorithm module 306. In addition, the adaptive DWE system depicted in FIG. 3 includes a signal-processing with data cache functional module 304. The driver workload assessment feedback module 302 provides the mechanism for the driver to input her subjective assessment of workload level so that the DWE model may be tailored to the paricular driver. The machine learning algorithm module 306 effectively updates the DWE module 210 based on the subjective driver feedback and the sensor inputs.

Figure 4:
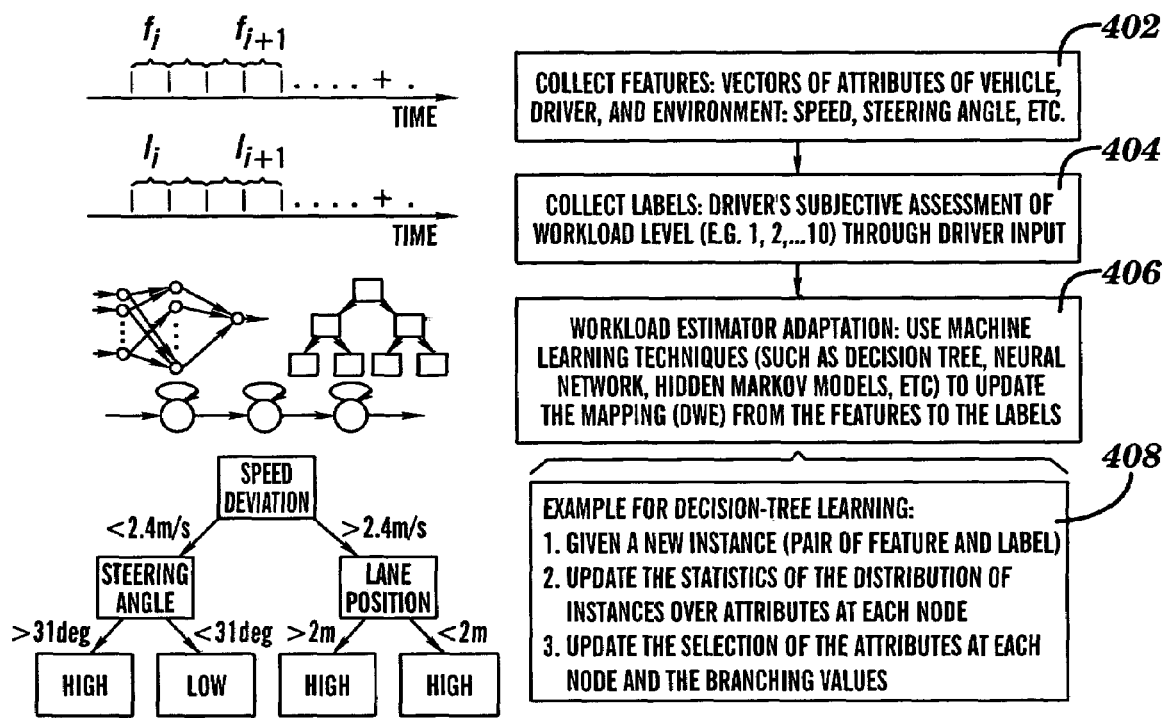
FIG. 4 is an example adaptation of learning algorithm that may be utilized by exemplary embodiments of the present invention.

FIG. 4 is an example adaptation algorithm that may be utilized by exemplary embodiments of the present invention. At block 402 features of the driver 202, the environment and the vehicle 204 are collected from sensors 206 by the signal-processing with data cache functional module 304. At block 404 the driver's 202 subjective assessment of workload level (e.g., 1, 2, . . . 10, or low, medium, high) are collected via the driver workload assessment feedback module 302. This may be referred to as collecting labels. At block 406, workload estimation adaptation takes place using machine learning techniques (e.g., discriminant analysis, decision tree, artificial neural network, hidden Markov model, Bayesian network, Bayesian belief network, case based reasoning (CBR), genetic algorithm, support vector machine, etc.) implemented in the machine learning algorithm module 306 to update the mapping of the DWE from the features to the labels (performed in the DWE module 210 by updating the DWE model. Block 408 contains an example for a decision tree learning workload estimator adaptation. Given a new instance (i.e., pair of feature and label), the statistics of the distribution of instances over attributes at each node are updated. In addition, the selection of the attributes at each node and the branching values are updated.

Exemplary embodiments of the present invention include a machine learning based DWE. The DWE model implemented by the DWE module 210 is updated by the machine learning algorithm 306 based on subjective feedback from the driver 202 via the driver workload assessment feedback module 302. The machine learning algorithm module 306 supports the 'adaptiveness' of the DWE in that the mapping from the features to the labels, or, from the input parameters to the workload index 212, is highly adaptive to the variation of sensor inputs. Instead of looking for the lowest common denominator in sensor groups in order to roll out one workload estimator across vehicle platforms, which reduces parameter coverage, estimator sophistication and prediction effectiveness, one can build a machine learning based DWE that is capable of adapting to various sensor groups. It is perceivable that with the quick advance of sensing technology, the list of sensors available on the vehicle will quickly expand; and a machine learning based DWE can easily benefit from such prospect due to its input adaptability.

In addition, exemplary embodiments of the present invention provide adaptability of the DWE module to the individual driver's cognitive characteristics. While driving, a driver 202 inputs a subjective assessment of workload level (e.g. 1, 2, . . . 10 or high, medium, low) through an input mechanism, for example, a push button or voice user interface. Such action triggers the collection of a windowed stream of input sensor data (by the signal processing with data cache functional module 304) along with the collection of the subjective workload level (by the driver workload assessment feedback module 302). In exemplary embodiments of the present invention, the data window varies from 0.5 second to 30 seconds. The signal processing with data cache functional module 304 retains a running cache of windowed data. Once the input data stream is collected, the machine learning algorithm module 306 updates the DWE module 210. The algorithmic update, in a decision tree estimator, would include statistics of the distribution of instances over attributes at each node, as well as the selection of the attributes at each node and the branching values.

The driver input mechanism may be implemented in any manner known in the art including, but not limited to, push buttons, touch screen, voice user interface, and the combinations thereof. It could be directly driver 202 initiated or prompted by the driver workload assessment feedback module 302. The driver-iniutated mechanism may be performed more frequently for a new driver 202 and less frequently as the DWE module 210 adapts to the driver 202.

In an exemplary embodiment of the present invention, the baseline DWE (prior to adaptation) is created via a training process. First, data are collected from subjects, or drivers 202, while driving the vehicle 204 in pre-designed experiments. The data not only include the sensory inputs but also the subjective workload rating and/or the secondary-task performance of the subjects. The latter serve as the training labels. Second, a model is learned from the data. The model can be a decision tree, an artificial neural network (ANNs), a Bayesian network, hidden Markov models (HMMs), Bayesian belief networks, a set of rules or discriminant functions, each of which is essentially a mapping from the input information to an output, in our case, workload index. The resulting DWE model 210 is then given to the DWE module 210 as the base-line driver workload estimator. Third, a cross-validation test is performed before the model is used to predict workload based on incoming data. To do cross validation, the training dataset is divided into subsets or folds. All the folds, except one, are used for training and the left-out fold is used for assessing the performance of the learned model. This process rotates through each fold and the average performance on the left-out folds is used as the performance measure of the algorithm. A cross validation process involves ten folds (ten subsets) is called a ten-fold cross validation.

Figure 5:
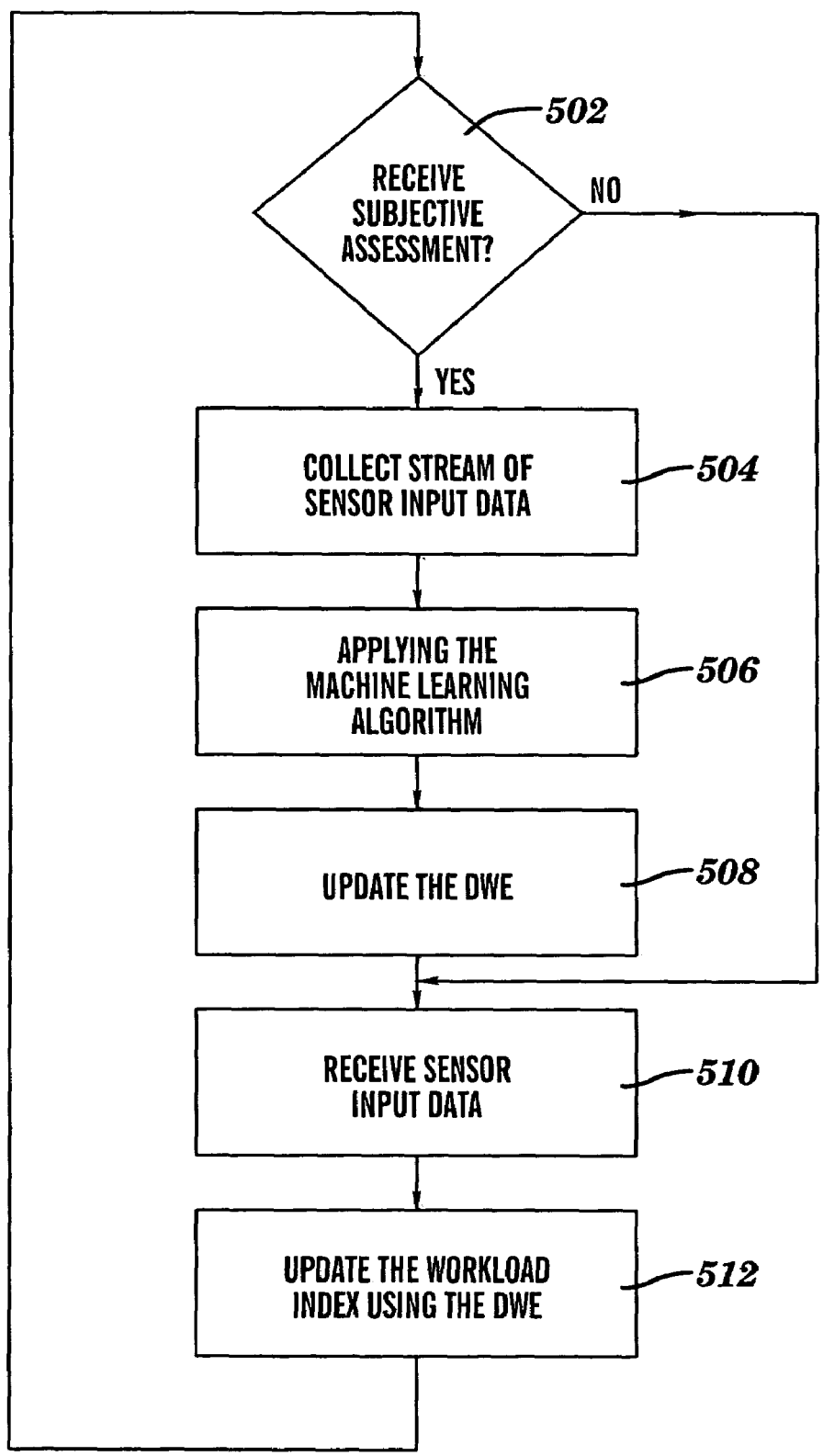
FIG. 5 is a process flow that may be utilized by exemplary embodiments of the present invention to perform adaptive driver workload estimation.

FIG. 5 is a process flow that may be utilized by exemplary embodiments of the present invention to perform adaptive driver workload estimation. At block 502, it is determined if a subjective assessment has been received from the driver 202 of the vehicle 204. If a subjective assessment has not been received from the driver 202, via the driver workload assessment feedback module 302, then block 510 is performed and input data from one or more sensors 206 is received. Next, at block 512, the DWE module 210 updates the workload index 212 based on the sensor input data. Processing then loops back up to block 502.

Alternatively, if it is determined at block 502 that a subjective assessment has been received from the driver 202 of the vehicle 204 via the driver workload assessment feedback module 302, then processing continues at block 504. At block 504, a stream of sensor input data is collected. Processing continues at blocks 506 and 508 where the DWE model in the DWE module 210 is updated using the machine learning algorithm in the machine learning algorithm module 306 using a process such as the one described in reference to FIG. 4. Processing then continues to block 510 wherein input data from one or more sensors 206 is received. Next, at block 512, the DWE module 210 updates the workload index 212 based on the sensor input data. Processing then loops back up to block 502. The loop beginning at block 502 may be performed on a near real time basis to continuously assess and update the workload index 212.

Figure 6:
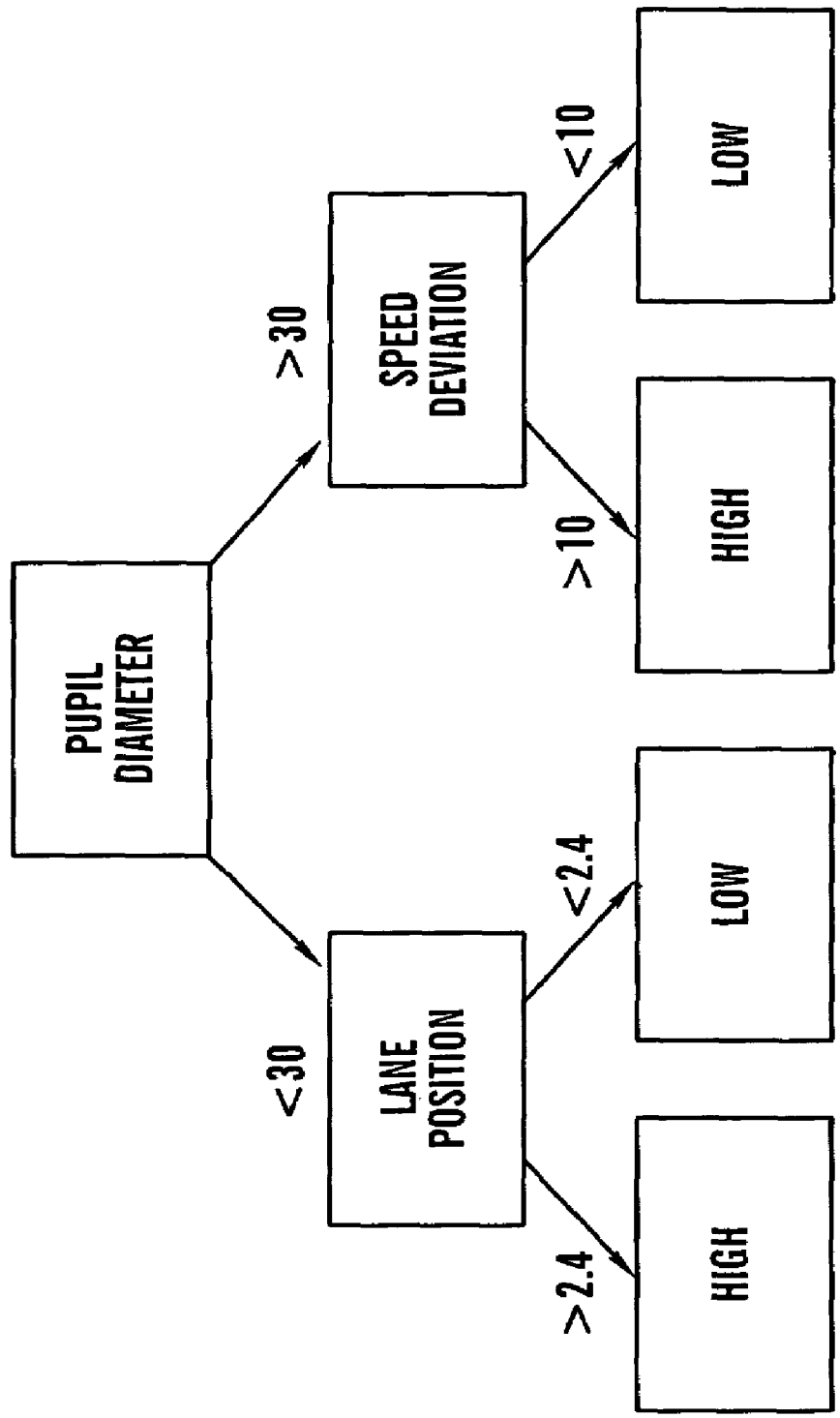
FIG. 6 is an exemplary decision tree for DWE.

FIG. 6 is an illustration of an exemplary DWE decision tree that may be utilized by exemplary embodiments of the present invention. A decision tree is a hierarchical structure in which each node corresponds to an attribute. If the attribute is categorical, each arc branching from the node represents one possible value of that attribute. If the attribute is numerical, each arc represents an interval of that attribute. A leaf of the tree specifies the expected value of the categorical information for the records described by the path from the root to that leaf. A decision tree can be easily converted to a set of if-then rules by traveling from the root to the leaves. This conversion is appealing because rules are more intuitive and compact to store. The goal of decision tree learning is to decide which attribute and what value should be the splitting point of branching in each node of the decision tree. Decision tree learning is one of the most widely studied methods for inductive inference and is a mature technique.

Figure 8:
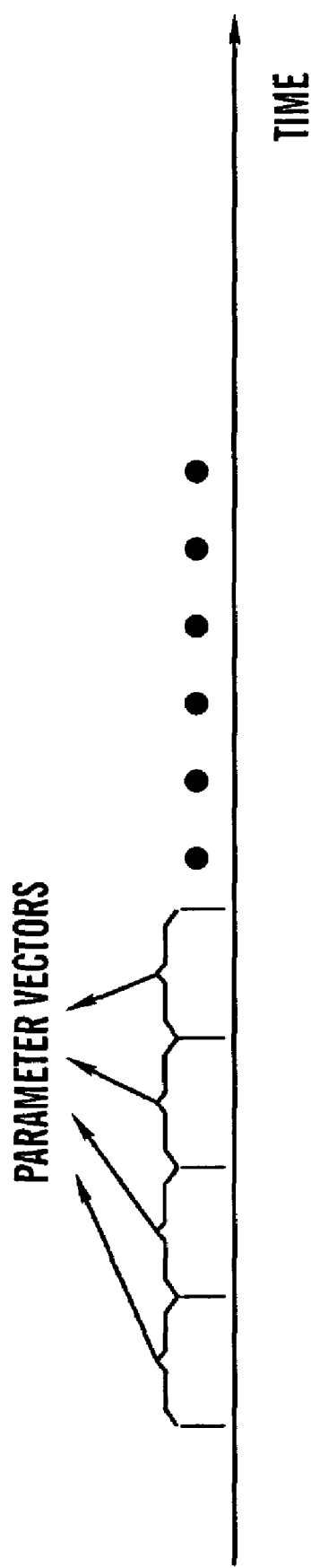
FIG. 8 illustrates exemplary time windows for signal processing and generating parameter vectors.
Figure 9:
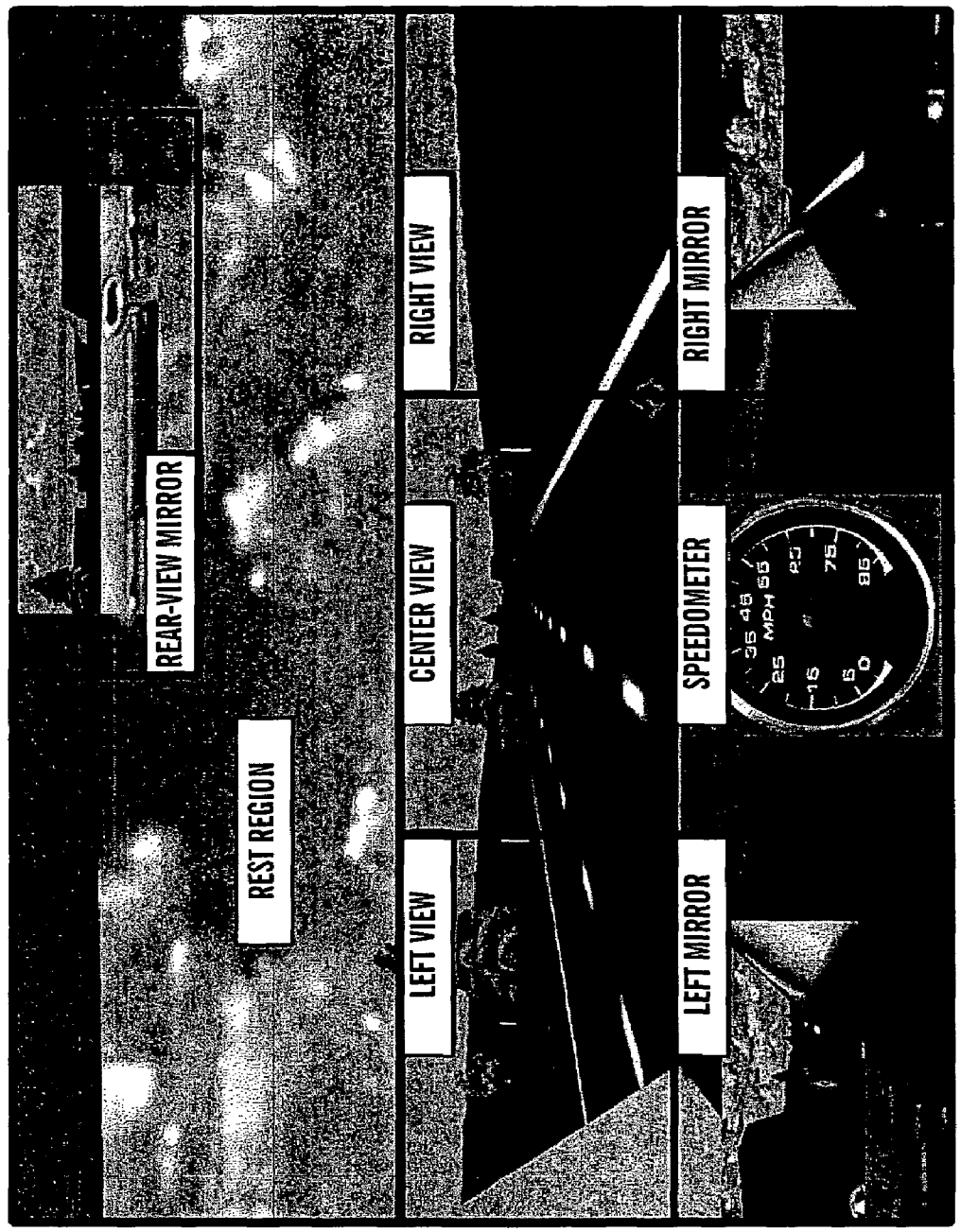
FIG. 9 illustrates exemplary regions dividing the driver's front view.

For example, the learning-based DWE design method described herein may be applied through designing a DWE using decision-tree learning, although many other machine learning techniques could be utilized. Sensory information may include vehicle velocity, lane position, steering angle, vehicle velocity, subject's pupil diameter, and subject's eye gaze position. The signal processing with data cache functional module 304 may be utilized to manipulate the raw sensory information and generate vectors of parameters or attributes. An exemplary list of parameters are listed in FIG. 7, over fixed-size time windows such as those depicted in FIG. 8. In FIG. 7, the regions refer to the eight regions of the driver front view as shown in FIG. 9.

In the example above, the learned DWE was able to detect whether a driver was focusing on the primary task, driving, or engaging in a secondary task such as a spatial-imagery or verbal task. In the driver-dependent test, part of one driver's data was used for training while the other part was used for testing. The correct detection rate reached as high as 93.4% for one of the twelve subjects that were studied. The average correct prediction rate exceeds 85% as shown in FIG. 10. FIG. 10 illustrates the correct prediction rates of the learned DWE in the driver-independent case with a half second time window, obtained with ten fold cross validation. In the driver-independent test, where the DWE was trained upon some drivers and tested upon the other ones, the correct prediction rate exceeded 81%. The rules converted from the thus-learned decision tree are given in FIG. 11. FIG. 11 contains rules that were extracted from the learned DWE decision tree in the driver-independent case for exemplary embodiments of the present invention. The numbers after "F" refer to the index of the parameters (attributes) listed in FIG. 7. Considering the gaze data may not be available for a low-end vehicle, a DWE decision tree was trained on the data minus the gaze data. The correct prediction rate degraded a little to 81% in the driver-dependent case.

In the conducted experiments, a general machine learning package was utilized. Usually a customized algorithm has a better performance in alternate than a general-purpose one. In alternate exemplary embodiments of the present invention, performance may be improved by developing customized machine-learning algorithms for DWE.

Exemplary embodiments of the present invention address the limitations in existing DWE technology by allowing for driver adaptability and model flexibility. The adaptable DWE centers on machine learning techniques that adapt to individual drivers and may lead to a high degree of reusability, parameter coverage, and estimation performance.

Exemplary embodiments of the present invention may be utilized to achieve a workload estimation/prediction with a high degree of effectiveness. In addition, exemplary embodiments of the present invention are capable of adapting to vehicles with different sensor availability and will easily accommodate future sensors.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. An embodiment of the present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

What is claimed is:

1. A method for adaptive driver workload estimation, the method comprising:
   receiving a subjective assessment of a driver workload from a vehicle driver, the subjective assessment entered directly by the vehicle driver via an input mechanism and indicative of the driver workload as perceived by the vehicle driver;
   collecting a stream of sensor input data from one or more sensors in response to receiving the subjective assessment; and
   applying a machine learning algorithm to a driver workload estimate model based on the stream of sensor input data and the subjective assessment, the applying resulting in an updated driver workload estimate model.

2. The method of claim 1 further comprising:
   receiving sensor input data; and
   updating a workload index in response to the sensor input data and to the updated driver workload estimate model.

3. The method of claim 2 wherein the sensor input data is received periodically on a substantially real time basis.

4. The method of claim 1 wherein creation of the subjective assessment is initiated by the vehicle driver.

5. The method of claim 1 wherein creation of the subjective assessment is initiated by logic located on the vehicle.

6. The method of claim 1 wherein the sensor input data includes one or more of vehicle data, driver data and environment data.

7. The method of claim 1 wherein the machine learning algorithm is implemented by a decision tree.

8. The method of claim 1 wherein the machine learning algorithm includes one or more of discriminant analysis, decision tree, artificial neural network, hidden Markov model, Bayesian network, Bayesian belief network, case based reasoning (CBR), genetic algorithm, and support vector machine.

9. A system for adaptive driver workload estimation, the system comprising:

an input device; and a microprocessor in communication with the input device, the microprocessor including instructions to facilitate:

受 receiving a subjective assessment of a driver workload from a vehicle driver, the subjective assessment entered directly by the vehicle driver via the input device and indicative of the driver workload as perceived by the vehicle driver;

collecting a stream of sensor input data from one or more sensors in response to receiving the subjective assessment; and applying a machine learning algorithm to a driver workload estimate model based on the stream of sensor input data and the subjective assessment, the applying resulting in an updated driver workload estimate model.

10. The system of claim 9 further comprising:

receiving sensor input data; and updating a workload index in response to the sensor input data and to the updated driver workload estimate model.

11. The system of claim 10 wherein the sensor input data is received periodically on a substantially real time basis.

12. The system of claim 9 wherein creation of the subjective assessment is initiated by the vehicle driver.

13. The system of claim 9 wherein creation of the subjective assessment is initiated by logic located on the vehicle.

14. The system of claim 9 wherein the sensor input data includes one or more of vehicle data, driver data and environment data.

15. The system of claim 9 wherein the machine learning algorithm is implemented by a decision tree.

16. The system of claim 9 wherein the machine learning algorithm includes one or more of discriminant analysis, decision tree, artificial neural network, hidden Markov model, Bayesian network, Bayesian belief network, case based reasoning (CBR), genetic algorithm, and support vector machine.

17. A computer program product for adaptive driver workload estimation, the computer program product comprising:

a storage medium readable by a processing circuit and storing instructions for execution by the processing circuit for performing a method comprising:

receiving a subjective assessment of a driver workload from a vehicle driver, the subjective assessment entered directly by the vehicle driver via an input mechanism and indicative of the driver workload as perceived by the vehicle driver;

collecting a stream of sensor input data from one or more sensors in response to receiving the subjective assessment; and applying a machine learning algorithm to a driver workload estimate model based on the stream of sensor input data and the subjective assessment, the applying resulting in an updated driver workload estimate model.

18. The computer program product of claim 17, wherein the method further comprises:

receiving sensor input data; and updating a workload index in response to the sensor input data and to the updated driver workload estimate model.

19. The computer program product of claim 17 wherein the sensor input data is received periodically on a substantially real time basis.

* * * * *